United States Patent [19]

Arnold, Jr. et al.

[11] 4,360,751
[45] Nov. 23, 1982

[54] FAN WITH INTEGRAL DISC-SHAPED DRIVE

[75] Inventors: Frank Arnold, Jr., Locust Valley; Dana F. Geiger, Great Neck, both of N.Y.

[73] Assignee: Kollmorgen Technologies Corporation, Dallas, Tex.

[21] Appl. No.: 157,069

[22] Filed: Jun. 6, 1980

[51] Int. Cl.³ .............................................. H02K 1/28
[52] U.S. Cl. ................................... 310/60 R; 310/63; 310/268
[58] Field of Search .................... 310/66, 268, 62, 63, 310/61, 60; 318/138, 254

[56] References Cited

U.S. PATENT DOCUMENTS

| | | | |
|---|---|---|---|
| 3,109,114 | 10/1963 | Henry-Baudot | 310/268 |
| 3,230,406 | 1/1966 | Henry-Baudot | 310/268 X |
| 3,337,122 | 8/1967 | Gross | 310/268 X |
| 3,961,864 | 6/1976 | Papst et al. | 310/63 X |
| 4,072,874 | 2/1978 | Arnold, Jr. | 310/268 |
| 4,164,690 | 8/1979 | Müller et al. | 310/63 X |

*Primary Examiner*—Donovan F. Duggan
*Attorney, Agent, or Firm*—Morgan, Finnegan, Pine, Foley & Lee

[57] ABSTRACT

A unitary fan and drive assembly is formed by means of a disc-shaped plate having a set of fan blades disposed along the periphery of the plate. A compact shape is provided by forming the drive with a rotatable member that is nested within a central recess of the plate. An electric drive is conveniently implemented by an electric motor wherein the rotatable motor member has fan blades disposed along the periphery and wherein the stationary motor member includes a low-profile annular array enclosing an assembly for electrically energizing the motor.

10 Claims, 4 Drawing Figures

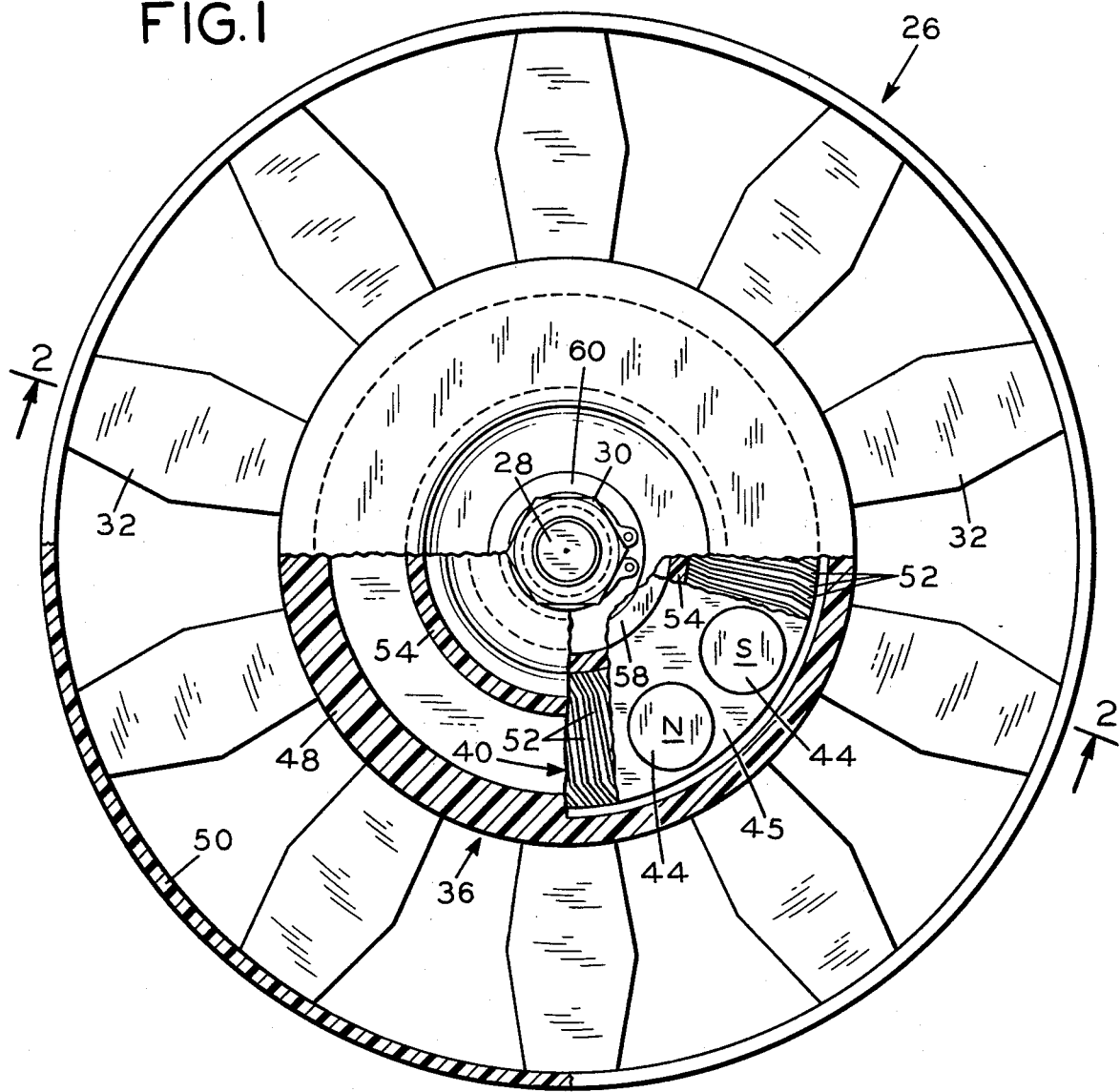
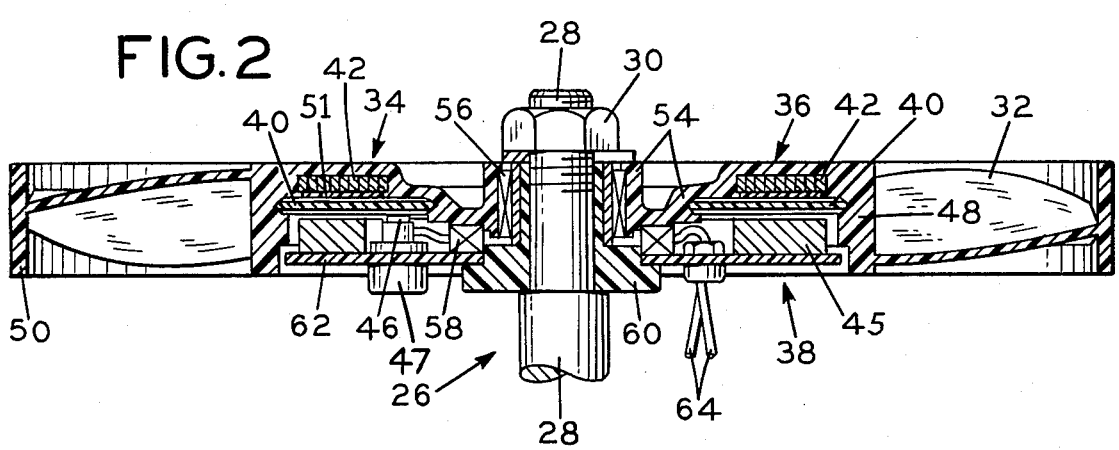

FAN WITH INTEGRAL DISC-SHAPED DRIVE

BACKGROUND OF THE INVENTION

This invention relates to a fan and, more particularly, to a compact, lightweight, low inertia fan configured to be used, for example, with a radiator for cooling an automobile engine.

Water or a coolant for liquid cooled automobile engines is conventionally circulated through a radiator. Such radiators are provided with fans which draw air through the radiator to cool the water or coolant which, in turn, cools the engine. Typically, the fan is connected to a pulley which is driven by the engine. The pulley, pulley drive and fan take up considerable space in the engine compartment. Furthermore, the fan is driven continuously while the engine is in operation and adds to the load on the engine. Such load is added even though, at start up and at high speed in cooler weather, air circulation by the fan through the radiator to cool the water or coolant may not be necessary. Indeed, automobile engines are typically provided with thermostats which prevent water or coolant circulation through the engine and radiator until the engine temperature reaches a predetermined value.

In some foreign cars, sports cars and, more recently, in U.S. manufactured cars with transversely mounted engines, the engine driven fan has been replaced with a fan driven with an electric motor. In such electric motor driven automobile radiator cooling fans, the pulley has been replaced with a conventional electric motor. The overall length of the fan assembly, with such an electric motor, is substantially equal to or slightly longer than the pulley-fan arrangement. The electric motors in such arrangements are, in many instances, thermostatically controlled to stop and start as engine cooling is required. However, the overall size and weight of the fan assembly and its electric motor necessitate care in the arrangement of mounting structures and in the placement of other components of the automobile to provide space for the fan assembly and its drive motor.

Since at least as early as July/August 1975, in an article at pages 34,35 of Automotive Design Engineering by P. Campbell and A. E. Corbett, it has been proposed to employ pancake or printed circuit motors in radiator cooling fan drives. In such proposed printed circuit motors, the brush gear was positioned between adjacent magnets for engagement with a commutator extending circularly around and axially along the axis of motor rotation. Thus, the brushes contacted the armature in a direction normal or at right angle to the axis of rotation of the motor and fan.

SUMMARY OF THE INVENTION

In the instant invention, a lightweight, compact, efficient fan and drive assembly contruction is provided within a unitary structure and having an axial length, as measured along the axis of rotation of the fan, substantially equivalent to the axial length of the fan itself. The drive assembly is formed of an electric motor having a rotor which supports blades of the fan about the periphery of the rotor. The rotor may be a flat cone or a shallow cup and, preferably is a flat disc. The rotor and fan blades are advantageously formed of a unitary molding which significantly reduces the costs of manufacture from the cost of a separate fan and drive.

In one embodiment of the invention, the rotor has the form of a circular plate which is adapted to support an armature and a magnetic ring positioned behind the armature, the armature and the ring being concentric about the axis of rotation of the rotor. A brush commutator is formed in a circumferential area of the inner ID of the armature and is planar therewith. The rotor is advantageously formed of a central recess with concentric rib surfaces whereby the armature and the magnetic ring may be recessed within the plate for a reduction in the axial length of the assembly. The magnetic ring is formed of a magnetic tape coiled into a closely wound spiral. The armature is formed of a disc-shaped, electrically insulating member upon which electrical conductors are disposed along both the front and the back surfaces thereof by a printed circuit process as is disclosed in U.S. Pat. No. 3,144,574 issued Aug. 11, 1964 in the name of Henry-Baudot, or by a wire-winding process as is disclosed in U.S. Pat. No. 3,834,414 issued Sept. 10, 1974 in the names of Burr et al. Alternative configurations of the windings for the armature are shown in U.S. Pat. No. 4,143,288 (FIG. 1) issued May 6, 1979 in the name of Sato; and in U.S. Pat. No. 4,107,587 (FIG. 1) issued Aug. 15, 1978 in the names of Ban et al. The stationary portion of the motor of such embodiment includes a stator formed with a low profile by an assembly of pie-shaped magnets disposed in an annular array about the axis of rotation. The rotor is rotatably supported by bearings and a stub shaft which is set within the stator. A set of brushes is disposed adjacent the annular array of magnets and in contact with the planar commutator area of the armature for electrically energizing the windings to impart rotation to the armature and to the fan blades. The overall front-to-back thickness of the fan, including its drive assembly, approximates the axial dimension of the fan blades to permit implacement of the fan in the confined regions of an automobile, for example, even within the space between the radiator and the grill and, in the case of air-conditioned cars, between the radiator and the air-conditioner condenser.

In another embodiment of the invention, the rotor or rotational portion of the motor includes an assembly of pie-shaped magnets disposed in an annular array about the axis of rotation. In such embodiment, the armature and magnetic ring positioned behind the armature and, preferably, formed of a magnetic tape coiled into a closely wound spiral, make up the stationary portion of the motor and are disposed annularly about the axis of rotation. The rotor is rotatably supported by bearings on a stud shaft set within the stator. A ring of rubber bonded ferrite, alternately polarized every 45° is positioned around the hub of the rotor and in alignment with magnetic sensors on the stator. The magnetic sensors are connected to a decoder, such as shown and described in U.S. patent application Ser. No. 903,677, to selectively and progressively energize fields in the armature winding ahead of the rotating magnets. Thus, the motor in this embodiment is brushless. Brush friction, brush wear, brush noises, and the like, are eliminated.

BRIEF DESCRIPTION OF THE DRAWINGS

The aforementioned aspects and other features of the invention are explained in the following description taken in connection with the accompanying drawings wherein:

FIG. 1 is a plan view of a disc-shaped fan assembly with an integral drive, in accordance with the invention, the view of FIG. 1 being partially cutaway to expose magnets of the stator and a winding of the armature of the fan assembly;

FIG. 2 is a sectional view of the fan assembly taken along line 2—2 of FIG. 1;

DESCRIPTION OF THE PREFERRED EMBODIMENTS

Figure 3:
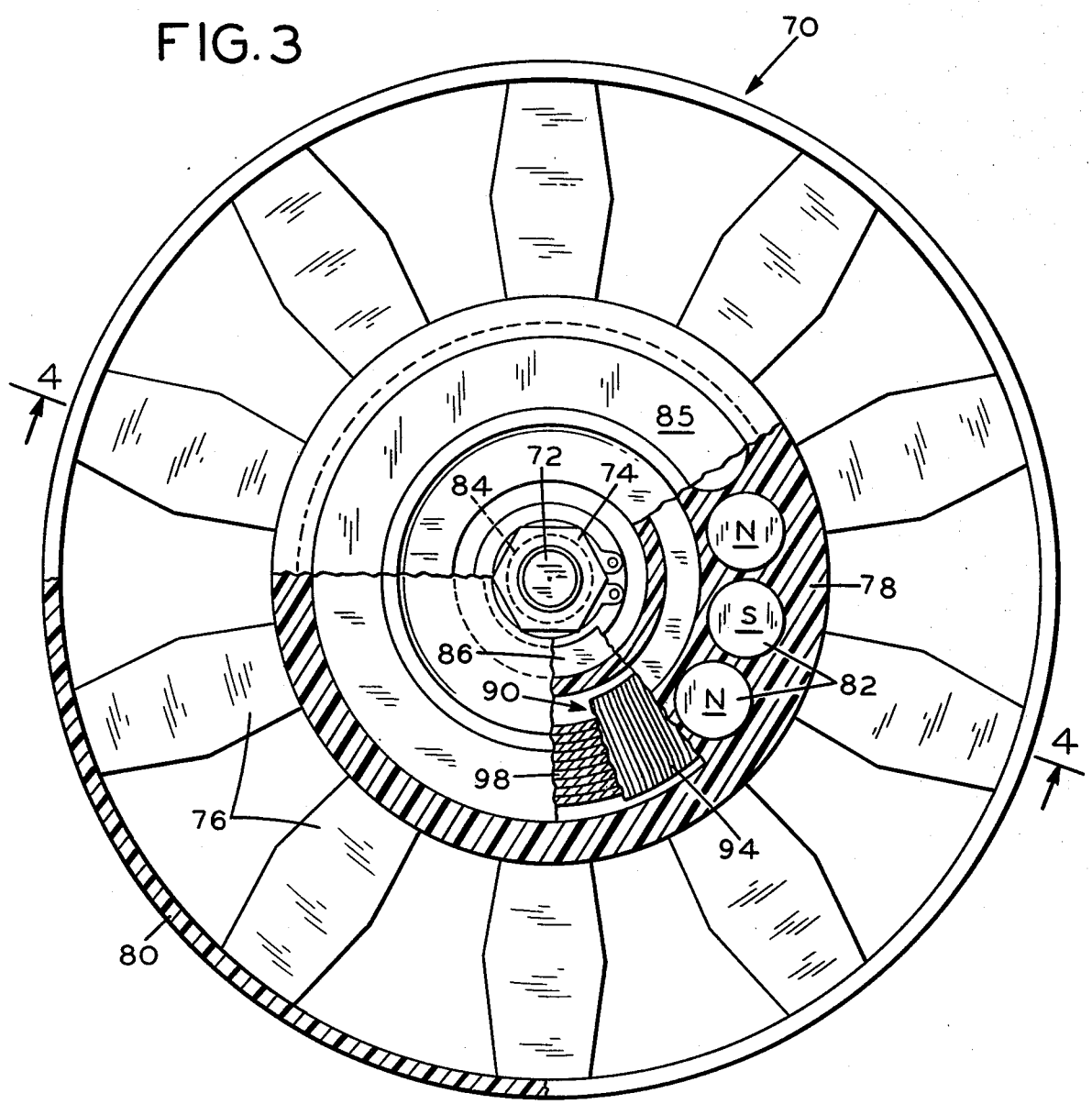
FIG. 3 is a view similar to FIG. 1 but showing the brushless motor embodiment of the invention.

Referring now to FIGS. 1 and 2, there are seen plan and sectional views of a fan, generally designated 26, constructed with a low profile in accordance with one embodiment of the invention. Fan 26 is attached to a support (not shown) by means of bolt 28 and nut 30. The fan is seen to be composed of a unitary assembly of fan blades 32 secured along the periphery of a drive unit, generally designated 34, which is presented diagrammatically in the enlarged view of fan 26. The drive unit 34 is seen to comprise a rotatable member or rotor, generally designated 36, mounted concentrically about a stationary member which includes a stator, generally designated 38. The spacing between the front and back surfaces of the drive unit 34 is made small by providing a recess within the rotor 36, and by nesting the stator 38 within the recess of the rotor 36.

The low profile of the drive unit 34 is advantageously accomplished by the utilization of a printed circuit motor having an axial air gap, and a moving coil configuration. The motor comprises the aforementioned rotor 36, an armature 40, a magnetic return ring 42, preferably made up of magnetic tape coiled into a closely wound spiral, and an annular array of magnets formed of a set of magnet poles 44 which have a pie-shaped form and are impressed into a ring 45 of permanent magnet material such as barium ferrite or strontium ferrite. The poles 44 and the spiral wound return ring 42 from a magnetic circuit. In the embodiment of FIGS. 1 and 2, the motor further comprises a set of brushes located within the annular array of magnet poles 44, one such brush 46 being seen in FIG. 2. The brushes, which are mounted in brush holders 47 are mounted for movement in a direction parallel to the axis of rotation of rotor 36 and are spring urged, in conventional fashion, into contact with the commutator portion of winding 52 of armature 40. The commutator portion of winding 52 extends circumferentially around the winding in the area adjacent the ID of winding 52 and is planar in the plane of rotation of rotor 36. Thus, any axial movement of rotor 36 relative to stator 38 is readily accommodated by spring urged brushes 46 without any interruption or change in the brush track between the brushes and the commutator, damages to the brush track or brushes or noise occasioned thereby.

The rotor is preferably fabricated of a unitary molding of a lightweight semi-rigid material, preferably a high-impact, heat-stable plastic which is electrically insulating such as polystyrene or polyurethane. The rotor 36 has an outer rim 48 which serves as a base for supporting the blades 32 and also defines the recess within the rotor 36 for enclosing the magnet poles 44 of the stator 38 and the brushes 46. A circumferential band 50 contacts the outer edges of each of the blades 32 to provide rigidity to the fan 26. The magnetic ring 42 is conveniently embedded within the material of the rotor 36, the armature 40 being positioned alongside the magnetic return ring 42 and separated therefrom a sufficient distance by an epoxy fiberglass insulator 51 between the ring 42 and a winding 52 of the armature 40.

As seen in FIG. 2, the rotor 36 has the form of a plate with the aforementioned outer rim 48 and also an inner rim 54 which is secured by a radial bearing 56 and a thrust bearing 58 to a stub shaft 60 of the stator 38. The bearings 56 and 58 permit rotation of the rotor 36 about the shaft 60 and also precisely position the rotor 36 relative to the stator 38 to provide clearance between the armature 40 and the poles 44 of the magnets, the clearance providing for electrical insulation of the windings 52 from the poles 44 while permitting the magnetic flux to propagate through the armature 40 to the magnetic return ring 42. The mounting bolt 28 is seen to pass through a central bore of the shaft 60. A magnetically permeable plate 62 of the stator 38 supports the magnet poles oriented parallel to the axis of the bolt 28 and the shaft 60 about which the rotor 36 rotates. The sense of the poling of the magnets 44 is alternated as may be seen by the N and S designation in FIG. 1, and as is explained with reference to FIGS. 2 and 3 of the U.S. Pat. No. 4,072,874 which issued in the name of Arnold on Feb. 7, 1978. The windings are supported on both sides of an insulating member of the armature 40 and are inclined with respect to radii of the armature 40 to provide the proper sense between a current in a winding 52 and the field of a magnet pole 44 as is explained in the aforementioned Henry-Baudot patent. Thereby, upon energization of the windings 52 by electric currents flowing through the brushes at the points of contact of the brushes 46 with the winding 52, a force is exerted on the windings 52 for rotating the rotor 36. An electric current is provided to the brushes 46 via leads 64 from a suitable source (not shown) of electric current such as an automobile battery.

Figure 4:
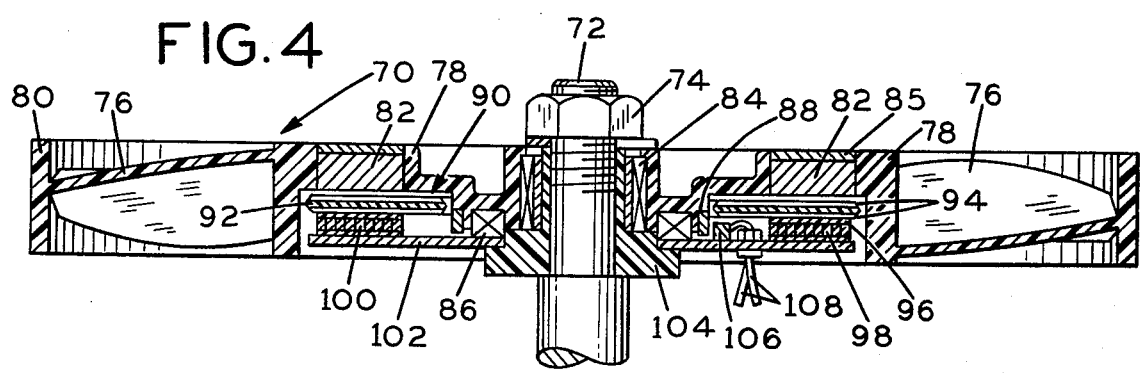
FIG. 4 is a sectional view of the assembly taken along line 4—4 of FIG. 3.

In the embodiment of the invention illustrated in FIGS. 3 and 4, the fan drive unit with which the fan blades are integrated and form a low profile assembly is of the brushless motor type. In such brushless motor embodiment, the fan assembly, generally designated 70, FIGS. 3 and 4, is mounted on a support, not shown, by bolt 72 and nut 74. Fan blades 76 are molded integral with rotor 78 and rim 80 extending circumferentially around rotor 78 at the periphery of blades 76. Magnets 82, in an alternating array of north poles and south poles extending circumferentially around bolt 72, are molded integrally in rotor 78. Ring 85 of magnetically permeable material, such as low carbon steel, is molded into rotor 78 behind magnets 82. Fan blades 76, ring 80 and rotor 78, except for the magnetic parts molded therein, are molded as a unitary structure of lightweight, high impact, semi-rigid, heat-stable electrical insulating plastic material, such as polystyrene or polyurethane. Rotor 78 is mounted for rotation on bolt 72 by bearing 84 and thrust bearing 86. Intermediate the inner end of fan blades 76 and its hub, rotor 78 is recessed. On the hub side of the recess, for purposes later more apparent, rotor 78 is provided with a ring of rubber bonded ferrite 88 extending circumferentially around the hub and being alternately polarized in north and south poles every 45° of circumference.

In the brushless motor embodiment of FIGS. 3 and 4, armature, generally designated 90, is made up of dielectric disc 92 and windings 94 and is adhesively fixed by electric insulating adhesive 96 to one side of magnetic ring 98 formed of a magnetic tape tightly coiled into a spiral. Spiral coiled magnetic ring 98 is fixed by adhesive 100 to mounting plate 102 fixed to hub 104 mounted in fixed position on mounting bolt 72. Sensors 106, of which only one is shown, are mounted in fixed position on mounting plate 102 and are connected by leads 108 to switching mechanism, such as shown and described in application Ser. No. 903,677, filed May 8, 1978, incorporated herein by reference.

In the brush motor embodiment of FIGS. 1 and 2 and the brushless motor embodiment of FIGS. 3 and 4, the armature is energized from the vehicle electric system, conventionally a 12 volt D.C. system with battery and alternator. In the brush motor embodiment of FIGS. 1 and 2, such energization is through the brushes while, in the brushless embodiment of FIGS. 3 and 4, the armature is energized through a switching arrangement, such as shown and described in the Ser. No. 903,677, controlled through the magnetic circuitry and relative positions of alternately polarized bonded ferrite ring 88 and sensor 106. In both instances a compact fan and fan motor are provided having a length approximately that of the fan blades.

It is to be understood that the above described embodiment of the invention is illustrative only and that modifications thereof may occur to those skilled in the art. Accordingly, it is desired that this invention is not to be limited to the embodiment disclosed herein but is to be limited only as defined by the appended claims.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed:

1. An integral fan and D.C. printed circuit electric motor drive assembly comprising:
    a stator assembly;
    an armature assembly having planar windings;
    mounting means for mounting said assemblies for rotating one of said assemblies in a planar path past the other of said assemblies;
    said rotating one of said assemblies including integral therewith and extending circumferentially therearound a set of fan blades;
    said fan blades forming a housing extending axially of the axis of rotation of said one of said assemblies and housing the other of said assemblies;
    said stator assembly including a magnetic circuit assembly directing a magnetic field to said planar windings of said armature in a direction normal to the plane of said armature;
    said armature assembly including a ring of magnetic tape spirally coiled and fixed to said armature and forming a flux return path for said magnetic field; and
    means for electrically energizing said planar windings of said armature to impart a rotary motion to said one of said assemblies past the other of said assemblies and to said fan blades integral therewith.

2. An integral fan and drive assembly according to claim 1, wherein the windings on said armature are disposed in planes parallel to the planar path of rotation.

3. An integral fan and drive assembly according to claim 2, wherein said magnet circuit assembly comprises a set of magnet poles disposed in an annular array about said axis of rotation.

4. An integral fan and drive assembly according to claim 3, wherein said electrically energizing means includes brush means disposed about said axis of rotation and located within said annular array to provide a disc-shaped drive.

5. An integral fan and drive assembly according to claim 3, wherein said electrically energizing means includes a polarized magnetic ring mounted on said rotating one of said assemblies and sensors mounted on the other of said assemblies in alignment with said polarized magnetic ring.

6. An integral fan and drive assembly according to claim 1 wherein said stator assembly is fixed and said armature assembly having planar windings is mounted for rotation in a planar path past said stator.

7. An integral fan and drive assembly according to claim 6, wherein said armature assembly includes a planar commutator for rotation in said planar path.

8. An integral fan and drive assembly according to claim 7, wherein said electrical energizing means includes brush means mounted on said stator about said axis of rotation for movement parallel to said axis of rotation for engagement with said planar commutator.

9. An integral fan and drive assembly according to claim 1, wherein said armature assembly having planar winding is fixed and said stator assembly is mounted for rotation in a planar path past said armature assembly.

10. An integral fan and drive assembly according to claim 9, wherein said electrical energizing means includes a polarized magnetic ring mounted on said stator assembly for rotation about said axis therewith and sensors mounted in fixed position on said armature assembly in alignment with said polarized magnetic ring.

* * * * *